(12) United States Patent
Jiang et al.

(10) Patent No.: US 10,529,086 B2
(45) Date of Patent: Jan. 7, 2020

(54) THREE-DIMENSIONAL (3D) RECONSTRUCTIONS OF DYNAMIC SCENES USING A RECONFIGURABLE HYBRID IMAGING SYSTEM

(71) Applicant: Futurewei Technologies, Inc., Plano, TX (US)

(72) Inventors: Wei Jiang, Santa Clara, CA (US); Wei Wang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 218 days.

(21) Appl. No.: 15/820,935

(22) Filed: Nov. 22, 2017

(65) Prior Publication Data

US 2019/0156504 A1 May 23, 2019

(51) Int. Cl.
*G06T 7/593* (2017.01)
*G06T 7/80* (2017.01)
(Continued)

(52) U.S. Cl.
CPC ............ *G06T 7/596* (2017.01); *G06T 7/85* (2017.01); *G06T 15/005* (2013.01); *G06T 17/20* (2013.01);
(Continued)

(58) Field of Classification Search
CPC ....... G06T 7/596; G06T 17/20; G06T 15/005; G06T 7/85; G06T 2210/56;
(Continued)

(56) References Cited

U.S. PATENT DOCUMENTS 9,330,491 B2 * 5/2016 Wang .................. G06T 15/205
10,154,246 B2 * 12/2018 Popov .................. H04N 13/271
(Continued)

FOREIGN PATENT DOCUMENTS

CN 103049929 A 4/2013
CN 103996220 A 8/2014
(Continued)

OTHER PUBLICATIONS

Alexiadis et al., "Real-Time, Full 3-D Reconstruction of Moving Foreground Objects From Multiple Consumer Depth Cameras," IEEE Transactions on Multimedia, vol. 15, No. 2, Feb. 2013, 20 pages.
(Continued)

*Primary Examiner* — Wesley J Tucker
(74) *Attorney, Agent, or Firm* — Fish & Richardson P.C.

(57) ABSTRACT

A computer-implemented method for a three-dimensional (3D) reconstruction of a dynamic scene includes receiving a plurality of color image sequences from a plurality of color imaging sensors, and at least one depth image sequence from at least one depth imaging sensor, where a color imaging sensor quantity is larger than a depth imaging sensor quantity. A plurality of calibrated color image sequences and at least one calibrated depth image sequence are generated based on the plurality of color imaging sequences and the at least one depth image sequence. A plurality of initial 3D patches is constructed using the plurality of calibrated color image sequences and the at least one calibrated depth image sequence. A 3D patch cloud is generated by expanding the plurality of initial 3D patches.

20 Claims, 5 Drawing Sheets

(51) Int. Cl.
*G06T 17/20* (2006.01)
*G06T 15/00* (2011.01)

(52) U.S. Cl.
CPC .......... *G06T 2207/10021* (2013.01); *G06T 2207/10024* (2013.01); *G06T 2207/10028* (2013.01); *G06T 2210/56* (2013.01)

(58) Field of Classification Search
CPC . G06T 2207/10024; G06T 2207/10028; G06T 2207/10021
See application file for complete search history.

(56) References Cited

U.S. PATENT DOCUMENTS

| | | | |
|---|---|---|---|
| 2008/0309662 A1* | 12/2008 | Hassner | G06K 9/20 345/419 |
| 2014/0168217 A1* | 6/2014 | Kim | G06T 13/40 345/420 |
| 2014/0184749 A1* | 7/2014 | Hilliges | G01S 17/89 348/47 |
| 2014/0225985 A1* | 8/2014 | Klusza | H04N 13/271 348/43 |
| 2017/0109611 A1* | 4/2017 | Luo | G06K 9/624 |
| 2018/0047208 A1* | 2/2018 | Marin | G06T 11/001 |
| 2019/0122393 A1* | 4/2019 | Sinharoy | G06T 9/001 |
| 2019/0139266 A1* | 5/2019 | Budagavi | G06T 9/001 |
| 2019/0156519 A1* | 5/2019 | Mammou | G06T 9/00 |

FOREIGN PATENT DOCUMENTS

| | | |
|---|---|---|
| CN | 106530395 A | 3/2017 |
| CN | 107103626 A | 8/2017 |
| WO | 2017079278 A1 | 5/2017 |

OTHER PUBLICATIONS

Anguelov et al., "SCAPE: Shape Completion and Animation of People," ACM transactions on graphics (TOG), vol. 24, No. 3, Jul. 2005, 9 pages.

Furukawa et al., "Accurate, Dense, and Robust Multi-View Stereopsis," IEEE transactions on pattern analysis and machine intelligence, vol. 32, No. 8, Aug. 2009, 14 pages.

Hartley, "Multiple View Geometry in Computer Vision: Second Edition" Cambridge University Press, 2003, 48 pages.

Izadi et al., "KinectFusion: Real-time 3D Reconstruction and Interaction Using a Moving Depth Camera," Proceedings of the 24th annual ACM symposium on User interface software and technology, Oct. 2011, 10 pages.

PCT International Search Report and Written Opinion issued in International Application No. PCT/CN2018/116383 dated Feb. 22, 2019, 9 pages.

Seitz et al., "A Comparison and Evaluation of Multi-View Stereo Reconstruction Algorithms," 2006 IEEE Computer Society Conference on Computer Vision and Pattern Recognition (CVPR'06), vol. 1, Jun. 2006, 8 pages.

\* cited by examiner

THREE-DIMENSIONAL (3D) RECONSTRUCTIONS OF DYNAMIC SCENES USING A RECONFIGURABLE HYBRID IMAGING SYSTEM

TECHNICAL FIELD

This disclosure relates to three-dimensional (3D) reconstructions of scenes.

BACKGROUND

Three-dimensional (3D) reconstructions can recover 3D models of objects in scenes by using image sequences or videos taken from different viewpoints. Real-time 3D reconstructions of moving objects in dynamic scenes can be useful for many applications, such as 3D tele-presence or tele-conferencing, augmented reality, remote surgery or education, e-commerce, film making, and computer video games.

SUMMARY

The present disclosure describes three-dimensional (3D) reconstructions of dynamic scenes using a reconfigurable hybrid imaging system.

In a first implementation, a computer-implemented method for a 3D reconstruction of a dynamic scene includes receiving color image sequences from color imaging sensors and at least one depth image sequence from at least one depth imaging sensor. Each of the color imaging sequences and the depth image sequence(s) includes images that capture the dynamic scene over a period of time. The number of the color imaging sensors is larger than the number of the depth imaging sensor(s). The received color imaging sequences and the received depth image sequence(s) are used to generate calibrated color image sequences and calibrated depth image sequence(s). Initial 3D patches are constructed using the calibrated color image sequences and the calibrated depth image sequence(s). The initial 3D patches are expanded to generate a 3D patch cloud. The 3D patch cloud can be used to compute a 3D mesh surface for the dynamic scene.

In some cases, intrinsic parameters and extrinsic parameters for each of the color imaging sensors and the depth imaging sensor(s) are determined. The extrinsic parameters for the color imaging sensors and the depth imaging sensor(s) are determined by geometrically calibrating the color imaging sensors and the depth imaging sensor(s) with a reference imaging sensor, where the reference imaging sensor is one of the color imaging sensors and the depth imaging sensor(s). Based on the intrinsic parameters and the extrinsic parameters, the color image sequences and the depth image sequence(s) are calibrated to generate the calibrated color image sequences and the calibrated depth image sequence(s). In some cases, a set of salient points is determined from the calibrated color image sequences and the calibrated depth image sequence(s). For each salient point, a set of imaging points corresponding to the salient point is determined in the calibrated color image sequences and the calibrated depth image sequence(s). Based on the set of imaging points, an initial 3D patch corresponding to the salient point is computed using a constrained triangulation. The constrained triangulation minimizes a cost function including at least one of a photo-consistency metric for the calibrated color image sequences, or a depth-consistency metric for the calibrated depth image sequence(s). In some cases, images of the calibrated color image sequences and the calibrated depth image sequence(s) are spatially divided into cells. Using a regularized optimization, the initial 3D patches are expanded to generate the 3D patch cloud that covers the cells.

In a second implementation, a computer-implemented system includes a memory storing instructions for a 3D reconstruction of a dynamic scene, and one or more hardware processors in communication with the memory. The one or more hardware processors execute the instructions to receive color image sequences from color imaging sensors and at least one depth image sequence from at least one depth imaging sensor. Each of the color imaging sequences and the depth image sequence(s) includes images that capture the dynamic scene over a period of time. The number of the color imaging sensors is larger than the number of the depth imaging sensor(s). The received color imaging sequences and the received depth image sequence(s) are used to generate calibrated color image sequences and calibrated depth image sequence(s). Initial 3D patches are constructed using the calibrated color image sequences and the calibrated depth image sequence(s). The initial 3D patches are expanded to generate a 3D patch cloud. The 3D patch cloud can be used to compute a 3D mesh surface for the dynamic scene.

In some cases, intrinsic parameters and extrinsic parameters for each of the color imaging sensors and the depth imaging sensor(s) are determined. The extrinsic parameters for the color imaging sensors and the depth imaging sensor(s) are determined by geometrically calibrating the color imaging sensors and the depth imaging sensor(s) with a reference imaging sensor, where the reference imaging sensor is one of the color imaging sensors and the depth imaging sensor(s). Based on the intrinsic parameters and the extrinsic parameters, the color image sequences and the depth image sequence(s) are calibrated to generate the calibrated color image sequences and the calibrated depth image sequence(s). In some cases, a set of salient points is determined from the calibrated color image sequences and the calibrated depth image sequence(s). For each salient point, a set of imaging points corresponding to the salient point is determined in the calibrated color image sequences and the calibrated depth image sequence(s). Based on the set of imaging points, an initial 3D patch corresponding to the salient point is computed using a constrained triangulation. The constrained triangulation minimizes a cost function including at least one of a photo-consistency metric for the calibrated color image sequences, or a depth-consistency metric for the calibrated depth image sequence(s). In some cases, images of the calibrated color image sequences and the calibrated depth image sequence(s) are spatially divided into cells. Using a regularized optimization, the initial 3D patches are expanded to generate the 3D patch cloud that covers the cells.

In a third implementation, a non-transitory computer-readable medium storing computer instructions for a 3D reconstruction of a dynamic scene which, when executed by one or more hardware processors, cause the one or more hardware processors to perform operations that include receiving color image sequences from color imaging sensors and at least one depth image sequence from at least one depth imaging sensor. The number of the color imaging sensors is larger than the number of the depth imaging sensor(s). The received color imaging sequences and the received depth image sequence(s) are used to generate calibrated color image sequences and calibrated depth image sequence(s). Initial 3D patches are constructed using the calibrated color image sequences and the calibrated depth image sequence(s). The initial 3D patches are expanded to generate a 3D patch cloud.

In some cases, intrinsic parameters and extrinsic parameters for each of the color imaging sensors and the depth imaging sensor(s) are determined. Based on the intrinsic parameters and the extrinsic parameters, the color image sequences and the depth image sequence(s) are calibrated to generate the calibrated color image sequences and the calibrated depth image sequence(s). In some cases, a set of salient points is determined from the calibrated color image sequences and the calibrated depth image sequence(s). For each salient point, a set of imaging points corresponding to the salient point is determined in the calibrated color image sequences and the calibrated depth image sequence(s). Based on the set of imaging points, an initial 3D patch corresponding to the salient point is computed using a constrained triangulation. In some cases, images of the calibrated color image sequences and the calibrated depth image sequence(s) are spatially divided into cells. Using a regularized optimization, the initial 3D patches are expanded to generate the 3D patch cloud that covers the cells.

The details of one or more implementations of the subject matter of this specification are set forth in the Detailed Description, the claims, and the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
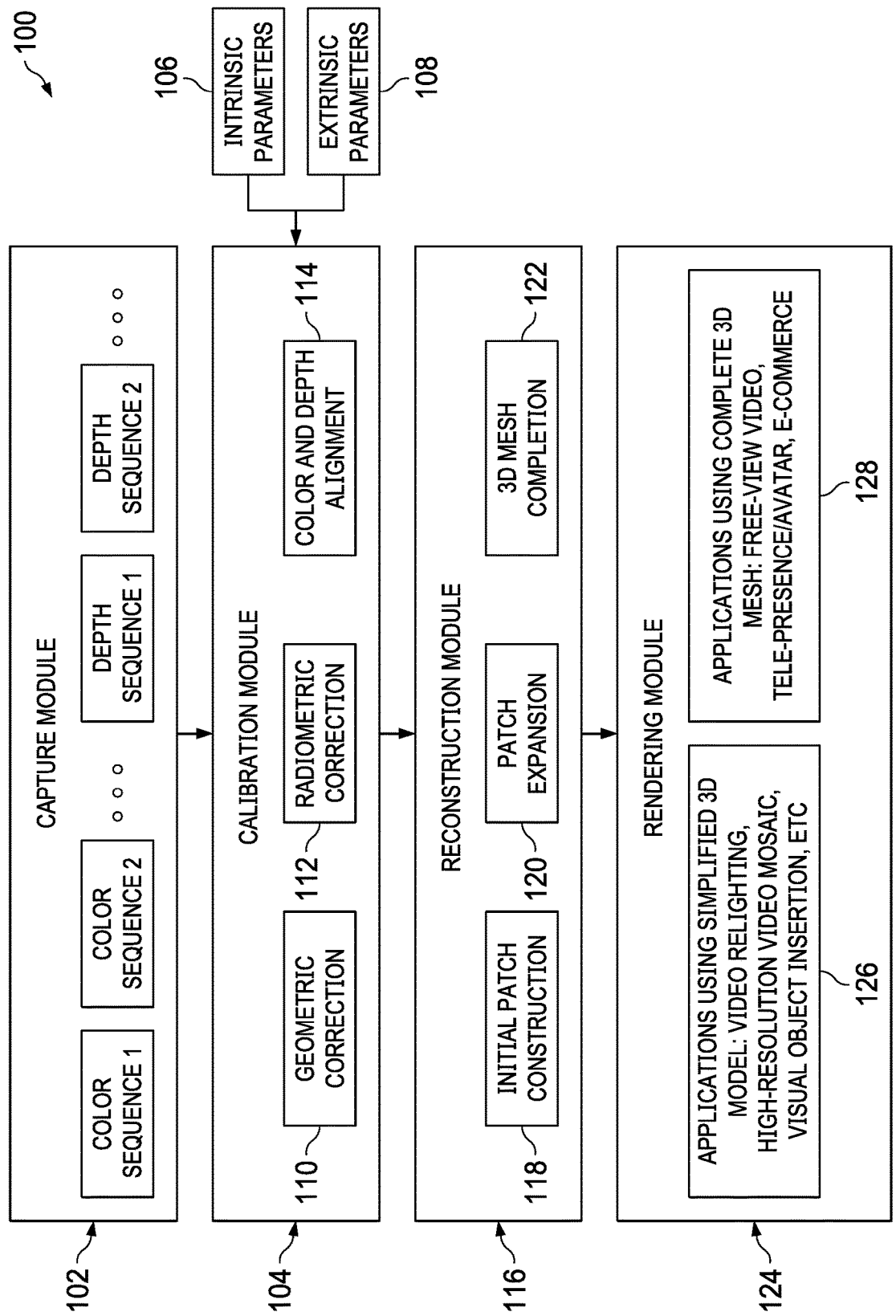
FIG. 1 is a block diagram illustrating an example three-dimensional (3D) reconstruction system for dynamic scenes using reconfigurable hybrid imaging sensors, according to an implementation.

The following detailed description describes three-dimensional (3D) reconstructions of dynamic scenes using a reconfigurable hybrid imaging system, and is presented to enable any person skilled in the art to make and use the disclosed subject matter in the context of one or more particular implementations.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

A 3D reconstruction recovers a 3D model of an object by using images taken from different views of the object. Color images, depth images, or both can be used to perform the 3D reconstruction. A depth image is captured by a depth imaging sensor (also called depth sensor), such as a time-of-flight camera, a ASUS XTION sensor, or a light detection and ranging (LiDAR) device. The depth image includes pixels. Each pixel has a pixel value indicating a distance (or depth) from the depth sensor to a corresponding point in a scene. For example, the depth sensor can transmit a signal to the scene and measure the distance based on a time difference between the transmitted signal and the reflected signal. The depth sensor can provide direct, fast, and accurate depth information. However, multiple depth sensors may not be placed close to each other because signals transmitted by the multiple depth sensors may interfere with each other. Further, due to limitations of transmitted signals, depth images usually have low spatial resolutions (for example, the depth images may have a smaller number of image pixels compared to conventional color images).

A color image is captured by a color imaging sensor (also called color sensor) such as a conventional red, green, and blue (RGB) camera, a digital single-lens reflex (DSLR) camera, a point-and-shoot camera, a webcam, or a camcorder. A color image includes pixels. Each pixel has a pixel value indicating a color of a point in the scene. For example, a color image can be an RGB image, a black-and-white image, or a gray-scaled image. Color images generally have high spatial resolution, and color sensors can be placed close to each other without interference problems. Although the color image itself does not include depth information, multiple color images from different viewpoints can be used to determine the depth information of a point in the scene using triangulation techniques. However, deriving depth information from color images is slow and computationally expensive, and the derived depth information is not as accurate as that from depth images. In addition, compared to depth sensors, color sensors are less robust to illumination variations, such as specular/glossy materials or poor-textured objects.

In some cases, inaccurate 3D models may be reconstructed for dynamic scenes. A dynamic scene refers to a scene including moving object(s). For example, multiple MICROSOFT KINECT sensors may be placed sparsely around a moving object, where each KINECT sensor bundles one color camera with one depth camera as a fixed configuration. The sparse placement of the KINECT sensors is not sufficient for reconstructing dynamic scenes with multiple occluding moving objects, and the recovery accuracy is limited. In addition, due to the interference problem of depth sensors, increasing the density of the placement of the KINECT sensors is challenging. As such, the KINECT sensors may not be placed densely enough to reconstruct real-world dynamic scenes with sufficient accuracy due to the fixed configuration of bundling one depth camera and one color camera.

In some implementations, a reconfigurable hybrid imaging system that includes both color and depth sensors can be used to enable real-time 3D reconstructions of a dynamic scene. Considering the complimentary characteristics of depth sensors and color sensors as discussed above, the hybrid imaging system places color sensors at a higher density than depth sensors. Each of the depth sensors and the color sensors captures an image sequence of the dynamic scene from a different viewpoint. Each image sequence include images captured at different time instants. The depth sensors and the color sensors are time synchronized so that the image sequences are captured at the same time instants. The color image sequences from the color sensors and the depth image sequences from the depth sensors are first calibrated. The calibrated depth image sequences and color image sequences are then used to reconstruct the 3D models of the dynamic scene. For example, the calibrated color and depth images at a particular time instant are used to reconstruct the 3D model of the dynamic scene at that particular time instant. In some implementations, the hybrid imaging system includes one depth sensor and more than one color sensors.

The 3D reconstructions of a dynamic scene described herein can effectively and accurately reconstruct high-resolution 3D models in real-time for the dynamic scene. The described approach overcomes interference problems of depth sensors by sparsely placing the depth sensors, and the missing depth information (e.g., due to a low resolution or from missing views) can be inferred from the densely placed color sensors. The described approach enables accurate and high-resolution 3D reconstructions by transferring the high spatial resolution (e.g., detailed 3D surface structures) from the color image sequences captured at different viewpoints to the depth image sequence(s) for enhancing the spatial resolution of the depth image sequence(s). The described approach enables 3D reconstructions for challenging dynamic scenes, such as objects with specular/glossy materials, poor-textured objects, or cluttered scenes with occlusions. For example, high-resolution image sequences from densely placed color sensors at different viewpoints provide information for 3D reconstructions of occluded objects. The described approach enables fast 3D reconstructions by using the depth image sequence(s) to generate initial 3D point clouds so that 3D models can be quickly generated by locating pixels corresponding to the initial 3D point clouds in the color image sequences. In addition, the color sensors and the depth sensor(s) in the hybrid imaging system can be easily reconfigured for capturing different dynamic scenes. The described approach also provides a low-cost 3D reconstruction system by using consumer-grade components (e.g., color cameras and depth cameras) at affordable prices. FIGS. 1-7 and associated descriptions provide additional details of the described approach.

FIG. 1 is a block diagram illustrating an example 3D reconstruction system 100 for dynamic scenes using reconfigurable hybrid imaging sensors, according to an implementation. The example 3D reconstruction system 100 can include a capture module 102, a calibration module 104, a reconstruction module 116, and a rendering module 124. As will be understood by those skilled in the art, the reconstruction system 100 can include additional, different, or a subset of modules from those shown in FIG. 1.

Figure 2:
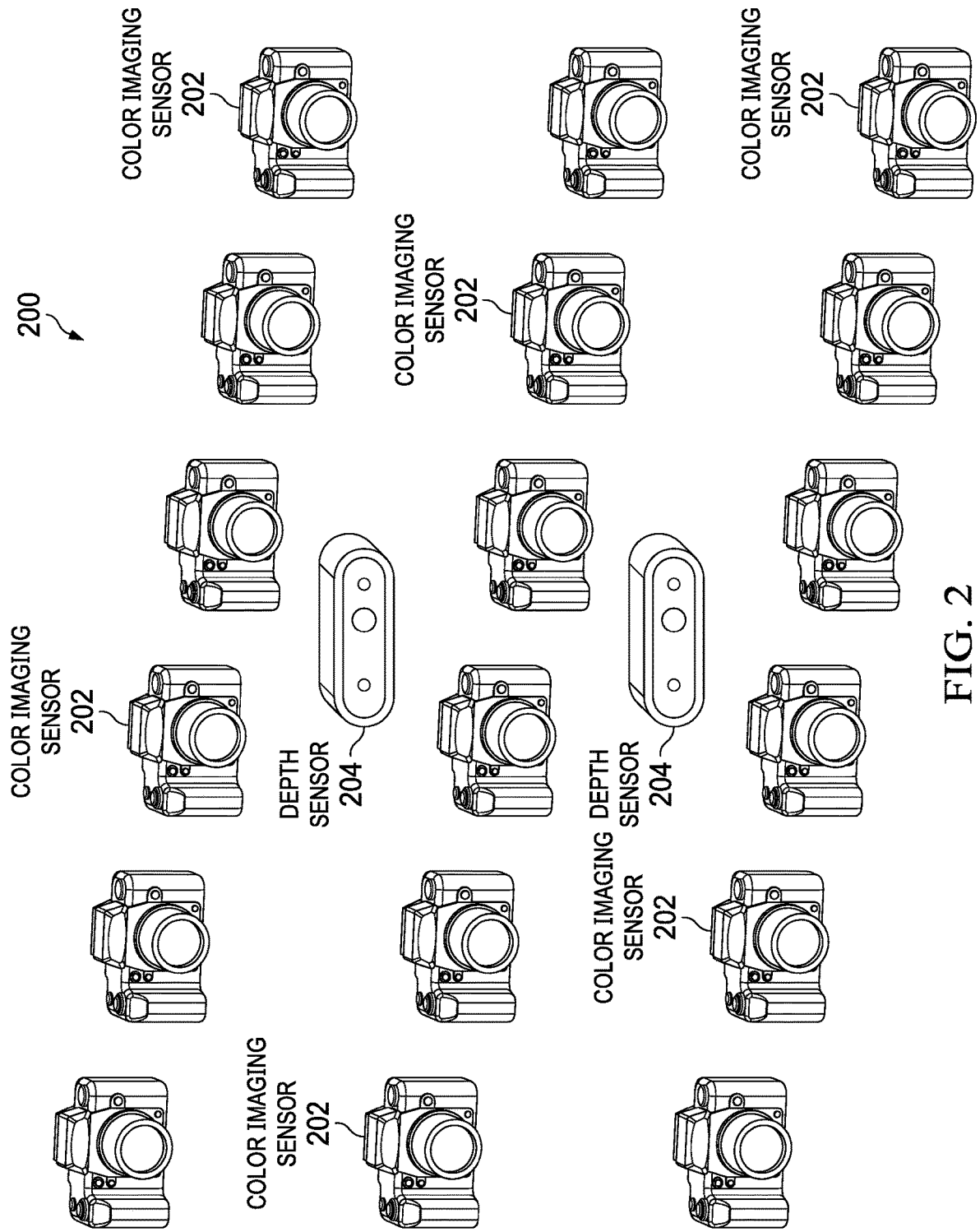
FIG. 2 illustrates a first example of a sensor array for 3D reconstructions of dynamic scenes, according to an implementation.
Figure 3:
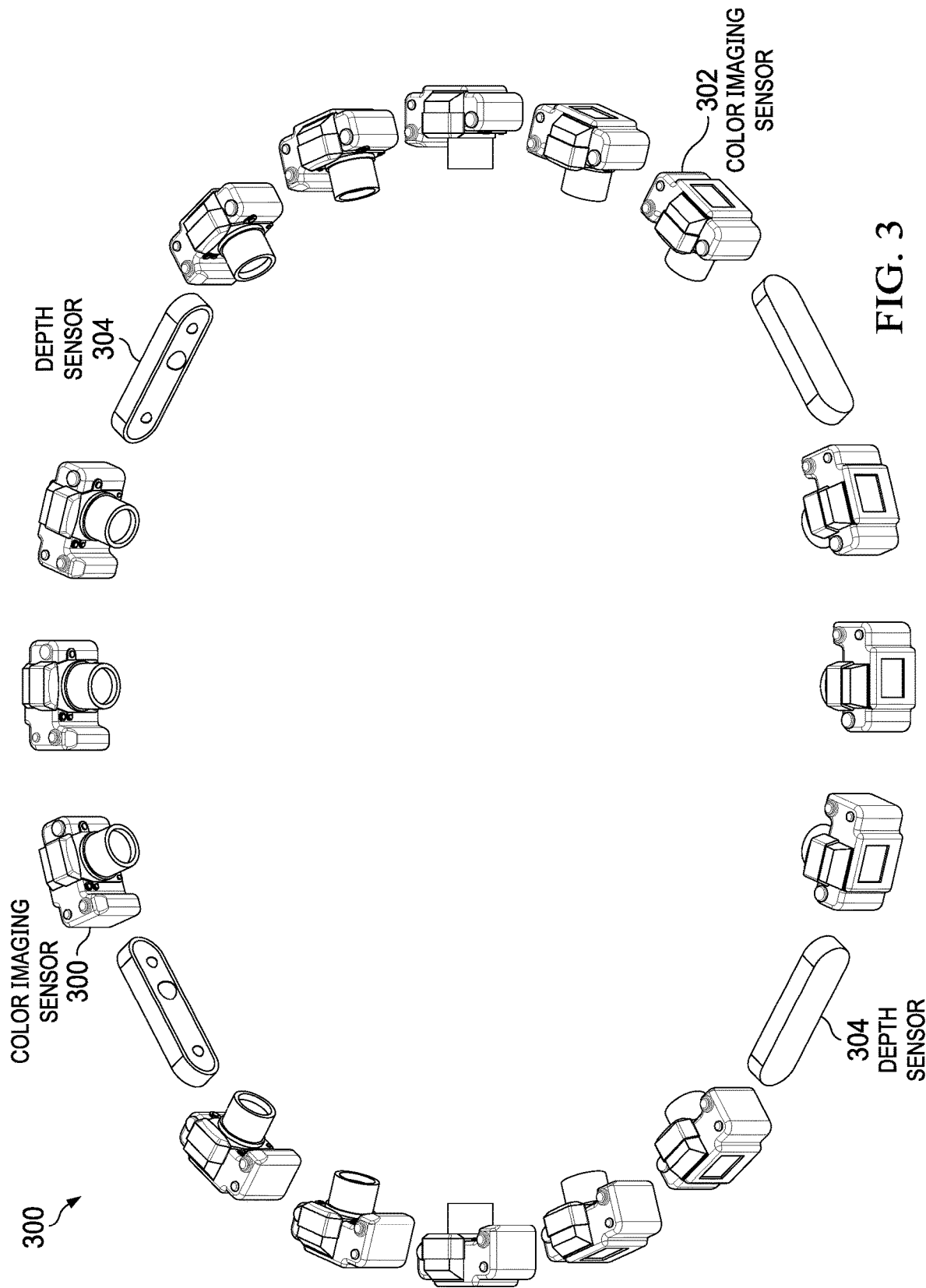
FIG. 3 illustrates a second example of a sensor array for 3D reconstructions of dynamic scenes, according to an implementation.

The capture module 102 receives image sequences of a target dynamic scene captured by M color sensors and N depth sensor(s) at different viewpoints over a period of time, where M>1, N>=1, and M>N. In other words, the capture module 102 receives M color image sequences and N depth image sequence(s). Each color image sequence is received from a respective color sensor recording color appearances of the target scene over the period of time from a particular view. Each depth image sequence is received from a respective depth sensor recording depth maps (or depth images) of the target scene over the period of time from a particular view. Each image sequence can include consecutive images (also called frames) of the target scene captured by a sensor at a uniform time interval, for example, 30 images or frames per second. The M color sensors and the N depth sensor(s) are time-synchronized so that the sensors capture images at the same time instants. The M color sensors and the N depth sensor(s) can form a sensor array as shown in FIGS. 2 and 3. In some implementations, the capture module 102 can include the M color sensors and the N depth sensor(s) capturing the M color image sequences and the N depth image sequence(s).

FIG. 2 illustrates a first example of a sensor array 200 for 3D reconstructions of dynamic scenes, according to an implementation. The sensor array 200 in this example embodiment includes eighteen color sensors 202 and two depth sensors 204 facing or directed toward a target scene. Similarly, FIG. 3 illustrates a second example of a sensor array 300 for 3D reconstructions of dynamic scenes, according to an implementation. The sensor array 300 includes sixteen color sensors 302 and four depth sensors 304 forming a circle around a target scene. It should be noted that the distribution of the color sensors 302 does not necessarily have to be uniform, as shown in FIG. 3, where there are 3 color sensors 302 in the upper and lower regions of the sensor array 300, while there are five color sensors 302 in the left and right regions. As will be understood by those skilled in the art, other sensor array configurations different from those in FIGS. 2-3 can also be used.

Each color sensor $CS_i$ (e.g. 202 or 302) can be placed arbitrarily in the 3D real world, as long as there is another color sensor $CS_j$ that has a large enough overlapping field of view with $CS_i$, for example, an overlapping field of view larger than a threshold $T_c$. Consequently, a color sensor 202 or 302 does not need to be oriented based on the orientations of neighboring color sensors 202 or 302, nor does the orientation of a color sensor 202 or 302 need to be precisely determined or controlled. Further, the color sensors 202 or 302 are not required to be equidistant from the target scene or object. Similarly, each depth sensor $DS_i$ (e.g., 204 or 304) can be placed arbitrarily in the 3D real world, as long as there is another depth sensor $DS_j$ that has a large enough overlapping field of view with $DS_i$, for example, an overlapping field of view larger than a threshold $T_d$. In addition, each depth sensor $DS_i$ is positioned so that there is a color sensor $CS_j$ that has a large enough overlapping field of view with $DS_i$, for example, an overlapping field of view larger than a threshold $T_{cd}$. The thresholds $T_c$, $T_d$, and $T_{cd}$ can have same or different values. The thresholds $T_c$, $T_d$, and $T_{cd}$ can be any value, for example, 15 or 30 degrees. In some cases, the thresholds are determined empirically. The fields of view among different sensors are overlapped so that each scene point in the 3D real world is captured by at least two sensors to enable the calibration module 104 to perform calibrations.

In an example implementation, as illustrated in FIGS. 2-3, the depth sensors are placed sparsely while the color sensors are placed densely. The relative positions and orientations of the color and depth sensors within the sensor array are fixed during each recording, while the position and orientation of the sensor array can change within the recording. For example, the sensor array can be mounted on a moving platform or frame for recording, and moved around the target scene or object. During a recording, the entire sensor array moves with the moving platform or frame, while the relative positions and orientations of the color and depth sensors within the sensor array are fixed. For recording image sequences of different scenes, the relative positions and orientations of the color and depth sensors within the sensor array can be reconfigured, for example, changing the configuration from FIG. 2 to FIG. 3.

The color image sequences and the depth image sequence(s) received at the capture module 102 are time synchronized. In other words, at a given timestamp, an image can be found in each color or depth image sequence that is captured at that time by the corresponding color or depth sensor. In some implementations, the color sensors and the depth sensor(s) can be time synchronized to a common time so that the multiple imaging sensors can capture images of the target scene at a same time.

The color image sequences and the depth image sequence(s) received at the capture module 102 are processed in the calibration module 104. The calibration module 104 uses intrinsic parameters 106 and extrinsic parameters 108 of sensors to align a set of color and depth images from the color and depth image sequences captured at a particular timestamp. For example, at each timestamp, images from the color and depth image sequences captured at that timestamp are collected for calibration.

For each depth or color sensor, the intrinsic parameters 106 and extrinsic parameters 108 can be determined by a calibration pre-process as discussed below. The intrinsic parameters 106 indicate internal parameters of a sensor and can include linear and non-linear intrinsic parameters. The non-linear intrinsic parameters include lens distortion coefficients of the sensor. The linear intrinsic parameters indicate a projective mapping from 3D world coordinates to two-dimensional (2D) image pixel coordinates. The linear intrinsic parameters can include parameters such as focal length and resolution, and can be represented as a three times three (3×3) upper triangular matrix (called an intrinsic matrix). The extrinsic parameters 108 indicate external parameters of a sensor and represent a coordinate system transformation from 3D world coordinates to 3D sensor coordinates. For example, the extrinsic parameters 108 can include a 3×3 rotation matrix and a three times one (3×1) translation vector. In some cases, the extrinsic parameters 108 can include a six degree-of-freedom position for each of the depth sensor(s) and the color sensors.

The calibration module 104 includes a geometric correction module 110, a radiometric correction module 112, and a color and depth alignment module 114. The color and depth alignment module 114 can correct lens distortion for each of the color and depth frames, for example, using the intrinsic parameters 106. The geometric correction module 110 can geometrically warp each of the color and depth frames at a given timestamp to align with a corresponding frame from a reference sensor, for example, using the extrinsic parameters 108. As will be discussed below, the reference sensor can be any color or depth sensor in the sensor array. The radiometric correction module 112 can radiometrically correct the appearance of each of the color and depth frames. Radiometric correction aligns colors of the color and depth frames, for example, by transferring pixel color values to radiance values. A camera response function (CRF) can be computed for each of the color and depth sensors, which transfers a pixel color value to a radiance value. A color checker can be used to determine the CRF. The geometric correction module 110 and the radiometric correction module 112 can also perform other operations of geometric correction and radiometric correction.

Figure 4:
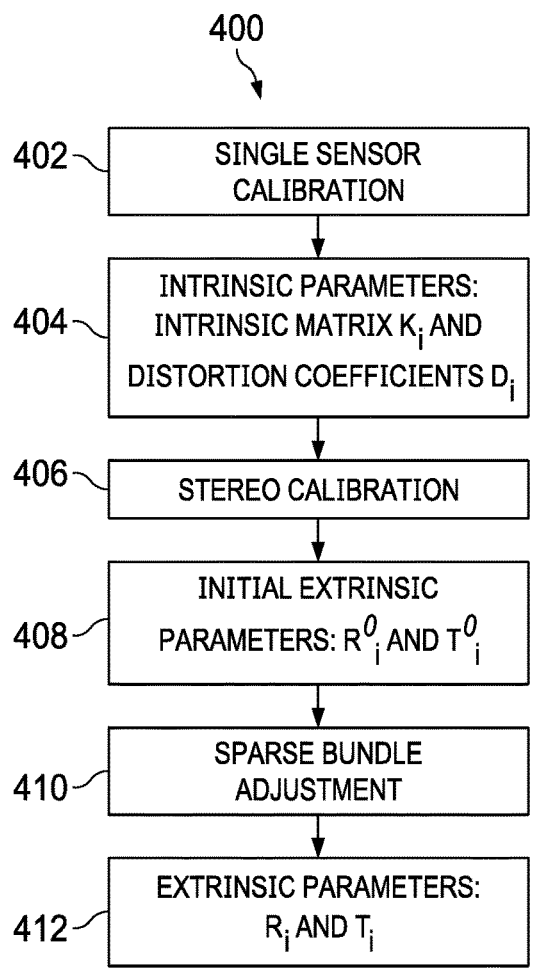
FIG. 4 is a flowchart of an example method of a calibration pre-process for computing intrinsic and extrinsic parameters of a sensor, according to an implementation.

In an example implementation, a calibration pre-process as shown in FIG. 4 is performed to compute the intrinsic parameters 106 and the extrinsic parameters 108 for each of the color and depth sensors. In some cases, part of the intrinsic and extrinsic parameters can be obtained through a sensor manufacturer and stored in the calibration module 104, and the remaining intrinsic and extrinsic parameters can be computed through the calibration pre-process. The outputs of the calibration module 104 are the calibrated color image sequences and depth image sequence(s), where at a given timestamp for a given scene point in the 3D real world, the corresponding 2D image points in each of the color images and depth images of that timestamp can be located.

FIG. 4 is a flowchart of an example method 400 of a calibration pre-process for computing intrinsic and extrinsic parameters of a sensor, according to an implementation. For clarity of presentation, the description that follows generally describes method 400 in the context of the other figures in this description. However, it will be understood that method 400 can be performed, for example, by any suitable system, environment, software, and hardware, or a combination of systems, environments, software, and hardware, as appropriate. In some implementations, various steps of method 400 can be run in parallel, in combination, in loops, or in any order.

At 402, a single sensor calibration process is performed to compute intrinsic parameters for each color or depth sensor. At 404, intrinsic parameters for the i-th sensor, including an intrinsic matrix $K_i$ and a set of lens distortion coefficients $D_i$, are determined. For example, the single sensor calibration can be performed by observing a calibration object whose geometry in the 3D space is known with good precision. The i-th sensor can capture an image of the known calibration object, e.g., a table with corners. The image pixels corresponding to the table corners can be identified from the captured image. Based on the known position of the table corners in the 3D space and the known pixel positions of the table corners in the 2D image, the intrinsic matrix and the lens distortion coefficients can be determined for the i-th sensor.

At 406, a stereo calibration process is performed to compute initial extrinsic parameters for each color or depth sensor by comparing the sensor with a reference sensor. The reference sensor can be any color or depth sensor in the sensor array. At 408, for the i-th sensor, a set of initial extrinsic parameters including a 3×3 initial rotation matrix $R^o_i$ and a 3×1 initial translation vector $T^o_i$ are computed by comparing the i-th sensor with the reference sensor. Similar to the single sensor calibration, the stereo calibration is performed by observing a calibration object whose geometry in the 3D space is known, for example, a table of corners. The i-th sensor and the reference sensor can both capture images of the table. The image pixels corresponding to the table corners can be identified from the images captured by the i-th sensor and the reference sensor. Based on the known position of the table corners in the 3D space and the known pixel positions of the table corners in the 2D images, the initial rotation matrix $R^o_i$ and the initial translation vector $T^o_i$ can be determined for the i-th sensor.

At 410, a sparse bundle adjustment process is performed to refine the initial extrinsic parameters and generate the final extrinsic parameters for each sensor. At 412, for the i-th sensor, the final rotation matrix $R_i$ and the final translation vector $T_i$ are generated. The sparse bundle adjustment optimizes the extrinsic parameters by considering error or noise in calibration observations, for instance, the 3D positions of the table corners and image pixel positions corresponding to the table corners may not be known accurately.

Turning back to FIG. 1, the calibrated color image sequences and depth image sequence(s) from the calibration module 104 are processed in the reconstruction module 116. The reconstruction module 116 can use a patch-based algorithm to reconstruct a simplified 3D model or a complete 3D mesh surface model for the target dynamic scene. The reconstruction module 116 includes an initial patch construction module 118, a patch expansion module 120, and a 3D mesh completion module 122.

The initial patch construction module 118 constructs a set of initial patches for the 3D model of the unknown object in the target scene. A patch p is a local tangent plane approximation of a surface of the object. In other words, a surface of a 3D object can be considered as a large number of small surface areas connected to each other, and a patch is one of the small surface areas. For instance, a patch can be rectangular, hexogen or other shapes. The patch is defined by a center c(p) of the patch, and a unit norm vector n(p) perpendicular to the patch. To recover the 3D model of the dynamic scene at time t, for each patch, a reference frame R(p,t) in which the patch is visible can be determined. The reference frame R(p,t) is captured at time t by a color sensor or a depth sensor, and the norm vector n(p) is oriented towards the sensor capturing the reference frame R(p,t). Note that every patch may be visible by a set of sensors. Given the set of calibrated color image sequences and depth image sequence(s), as discussed below, the initial patch construction module 118 can generate a set of initial sparse patches for the 3D model at time t by identifying and matching salient points across multiple images or frames from different sensors.

In an example implementation, salient points can be detected in each of the color and depth frames. Salient points are image pixels with salient features. Salient features can be certain image texture characteristics, for example, corner or blob features. A blob is an image region that differs in properties, such as brightness or color, compared to surrounding regions. A blob can be an image region in which certain properties are constant or approximately constant, that is, pixel points within a blob can be considered in certain sense to be similar to each other. A corner is an intersection of two edges. In some cases, corner and blob features can be determined using Harris and Difference-of-Gaussian (DoG) operators. For each detected salient point, corresponding points (image pixels) in other calibrated frames from other sensors at the same timestamp can be located. That is, multiple salient point sets can be determined, where each set contains a number of points corresponding to a same scene point in the 3D real world captured by different color or depth sensors at the same time. Using triangulation techniques, an initial patch can be generated based on each of the point sets. Various factors can be considered in the triangulation. For instance, a threshold can be set for a minimum supporting number of frames in which a patch is visible. In addition, a photometric discrepancy measurement (e.g., Equation (1) below) can be used to optimize the geometry of the initial patches. Other regularization terms such as bounds on the size of the patches can also be used.

In some cases, corner and blob features are first detected in each frame (a color or depth frame) using, for example, Harris and DoG operators. Each frame is laid over a coarse regular grid of uxu pixel cells (e.g., u=32), and Harris and DoG operators are used for each cell to determine corners and blobs in the cell (for example, based on a threshold number of local maxima of Harris and DoG operators). Features found in each frame are matched across multiple frames to reconstruct a set of sparse patches, which are stored in the grid of cells overlaid on each frame. Consider a frame I(i,t) (a color or depth frame) captured by the i-th sensor at timestamp t. For each feature f detected in the frame I(i,t), a set of features f' of the same type (Harris or DoG) that lie within k pixels (e.g., k=2) from the corresponding epipolar lines can be collected from other color and depth frames captured at the same time t. The 3D point associated with each pair (f,f') can be determined using triangulation, and a distance from the determined 3D point to the optical center of the i-th sensor is calculated. The 3D points associated with all pairs (f, f') are considered as potential patch centers and arranged in an order of increasing distance between the optical center of the i-th sensor and each of the 3D points. Potential patches can be determined by sequentially examining the ordered potential patch centers starting from the one closest to the optical center of the i-th sensor. The first potential patch that is photo-consistent (or truly visible) in at least a threshold number of images is considered to be a valid patch.

For example, for each feature f', a potential surface patch p can be reconstructed by triangulating f and f' to obtain an estimate of the center c(p). The direction of the optical ray joining c(p) to the optical center of the i-th sensor is considered to be the surface norm vector n(p) of the potential surface patch p. The frame I(i,t) associated with feature f is set to be the reference frame R(p,t) for the potential surface patch p. A normalized cross correlation N(p,R(p,t),J) for the patch p's projections into frames R(p,t) and J can be used to measure photo consistency. For example, if the normalized cross correlation N(p,R(p,t),J) is larger than a threshold, the potential patch p is considered to be truly visible in the frame J. The frame J is then included in a frame set T(p,t), where the frame set T(p,t) includes the color and depth frames at time t in which the potential patch p is truly visible. After determining the reference frame R(p,t) and the frame set T(p,t), the center c(p) and the surface norm n(p) of the potential patch p can be further refined by maximizing the following average normalized cross correlation score:

$$\overline{N}(p) = \frac{1}{|T(p,t)|-1} \sum_{J \in T(p,t), J \neq R(p,t)} N(p, R(p,t), J) \quad (1)$$

where |T(p,t)| is the number of frames in the frame set T(p,t). The refined c(p) and n(p) can be used to determine a final frame set T(p,t). If the number of frames in the final T(p,t) is more than a threshold, the potential patch p based on the refined c(p) and n(p) is a valid patch.

In some implementations, depth consistency can be used in addition to the photo consistency to further refine the initial patches. For example, for a 3D patch p with center c(p) and surface norm n(p) determined by maximizing the average normalized cross correlation score in Equation (1), the 3D patch p can be projected into a frame I(i,t) as $H_I(p)$ for the i-th depth sensor based on the intrinsic and extrinsic parameters of the i-th depth sensor. In other words, based on the distance between the patch p and the i-th depth sensor as well as the intrinsic and extrinsic parameters of the i-th depth sensor, a depth map $H_I(p)$ corresponding to the patch p can be constructed for the i-th depth sensor. At the same time, the i-th depth sensor has depth measurement $D_i(p)$ for the projected patch area. As a result, depth consistency can be used to refine the patch p by minimizing the following:

$$\min_p \Sigma_i |H_i(p) - D_i(p)|^n \qquad (2)$$

where n can be an integer or non-integer number, $|H_i(p) - D_i(p)|^n$ represents a difference between depth values in $H_i(p)$ and $D_i(p)$, and the sum operation is performed over all depth frames in which the patch p is visible.

In some implementations, an initial 3D point cloud can be generated from the depth image sequence(s), and the initial patches are generated based on the initial 3D point cloud. The initial 3D point cloud includes a set of sparse 3D points corresponding to the salient points. Pixels corresponding to the initial 3D point cloud are located in the color image sequences. The initial patches can be determined using a constrained triangulation of the corresponding pixels. The constrained triangulation minimizes a cost function including at least one of the following terms: photo consistency across the color image sequences (e.g., Equation (1)), and/or depth consistency across the color image sequences and the depth image sequence(s). By generating the sparse 3D point cloud from the depth image sequence(s), the described approach can avoid ambiguity for finding corresponding pixels across multiple viewpoints and perform 3D reconstructions for specular or glossy objects and poor-textured objects. In sum, the initial patch construction module 118 generates a set of initial patches sparsely distributed in the 3D space.

The patch expansion module 120 expands the initial patches from the initial patch construction module 118 to cover dense spatial regions. In other words, the sparsely distributed initial patches are expanded to cover surfaces of objects in the scene. For example, a frame I(i,t) can be divided into a number of cells, and the patch expansion module 120 expands the initial patches to cover all the cells. In some implementations, patch expansion is fulfilled through a regularized optimization process. A graph can be generated where graph nodes are the cells and the graph edges indicates neighboring information of the cells. For example, the graph can be fully connected where a weight (for instance, with a value between zero and one) between two nodes indicates a strength of the connection between these nodes. A weight of zero indicates that the two cells are not neighbors, while a weight of one indicates that the cells are direct neighbors. In some implementations, the weight can be determined based on a spatial distance between two cells as well as a depth difference between the two cells. For example, the closer the two cells are located, the larger the weight is. The smaller the depth difference between two cells is, the larger the weight is. The weight can be calculated as $$W = q \log(1/D_s) + (1-q)\log(1/D_d) \qquad (3)$$

where $D_s$ and $D_d$ are the spatial distance and the depth difference between two cells, respectively, and q can be a value between 0 and 1.

For each initial patch, a set of neighboring cells can be identified in each of the frames in which the patch is visible (that is, the patch is captured in those frames). The geometry of the expanded patches can be jointly optimized by using the graph described above and taking into account the following regularization terms or factors:

terms indicating surface structure consistency: for example, close neighboring cells (with strong connections or large weights) are more likely to share similar surface structures, and distant cells (with weak connections or small weights) are less likely to share similar patches;

terms indicating a photometric discrepancy measurement test and a minimum supporting number of visible frames test: a valid patch is a patch that passes the photometric discrepancy measurement test and the minimum supporting number of visible frames test. For example, a valid patch is visible in at least a threshold number of frames;

terms indicating a geometry test: a valid patch is a patch that satisfies the geometry test, e.g., a projection of the center of the patch is inside a supporting cell;

terms indicating a depth consistency across the color image sequences and the depth image sequence(s); and terms indicating a temporal consistency criterion: a valid patch is a patch that satisfies the temporal consistency criterion, e.g., the temporal discrepancy of a patch at consecutive timestamps is smaller than a threshold.

Other regularization terms consistent with this disclosure such as the bounds on the size of the patches can also be used.

In some implementations, for each initial patch p, a hexagon (or an area of other shape such as square) can be formed around the patch p with an area size s and a norm vector n. The purpose of the patch expansion is to expand the hexagons of the initial patches to cover the 3D surface in the scene. Patch expansion can be performed by maximizing the area of the expanded patches while satisfying regularization terms, such as the photo consistency and depth consistency regularization terms defined in Equations (1) and (2).

The patch expansion module 120 generates a surfel (surface element) model of the dynamic scene for each timestamp. The surfel model can be considered as a 3D patch cloud including patches densely distributed in the 3D space. The 3D patch cloud can be used to generate a simplified 3D model of the dynamic scene. The simplified 3D model can be directly used in a variety of applications, such as video relighting, high-resolution video mosaic, virtual object insertion, and material editing. In these applications, the simplified 3D model (e.g., surface elements or layered-based model) is often sufficient to compute novel shading/materials or to register multiple video streams. In some other applications such as free-view video, 3D tele-presence/avatar, and e-commerce, a refined 3D model can be used. The 3D mesh completion module 122 can compute a refined 3D surface mesh of the dynamic scene. For example, from the 3D patch cloud from the patch expansion module 120, an initial 3D mesh can be obtained by surface reconstruction techniques, e.g., Poisson surface reconstruction. The initial 3D mesh can be further optimized based on statistical priors on 3D models and photo-consistency of features across multiple views (or sensors). For instance, the statistical pose and body models for human can be used to estimate human pose from 2D images.

The rendering module 124 sends the simplified 3D model from the patch expansion module 120 or the complete 3D mesh from the 3D mesh completion module 122 to applications, such as application 126 that uses the simplified 3D model, and application 128 that uses the complete 3D mesh. The applications 126 and 128 can be on a same device as or a different device from the example system 100. In some cases, the rendering module 124 can render the simplified 3D model or the complete 3D mesh.

Figure 5:
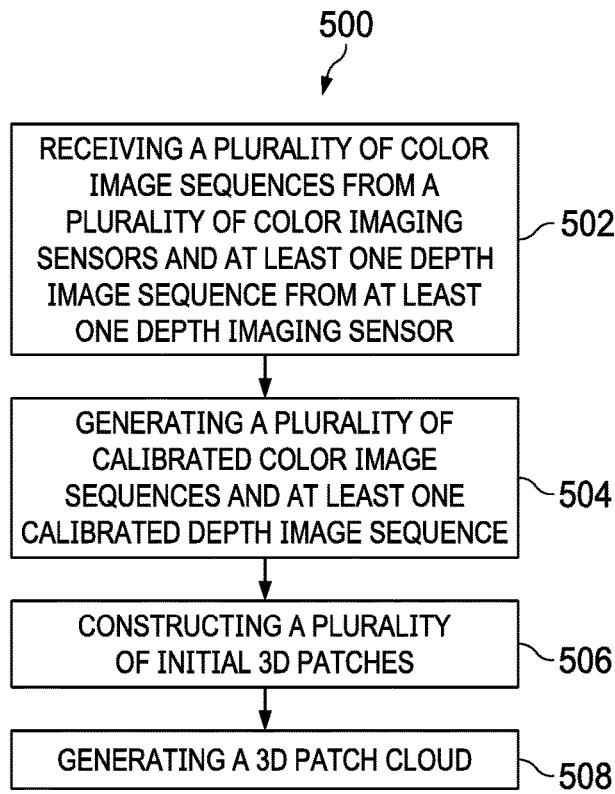
FIG. 5 is a flowchart of an example method for 3D reconstructions of dynamic scenes using reconfigurable hybrid imaging sensors, according to an implementation.

FIG. 5 is a flowchart of an example method 500 for 3D reconstructions of dynamic scenes using reconfigurable hybrid imaging sensors, according to an implementation.

The method 500 can be implemented by the 3D reconstruction system 100 in FIG. 1. The method 500 can also be implemented using additional, fewer, or different components. Furthermore, the method 500 can also be implemented using additional, fewer, or different operations, which can be performed in the order shown or in a different order. In some instances, an operation or a group of operations can be iterated or repeated, for example, for a specified number of iterations or until a terminating condition is reached.

The example method 500 begins at 502, where the 3D reconstruction system receives color image sequences from multiple color sensors, and at least one depth image sequence from at least one depth sensor. The number of the color sensors is larger than the number of depth sensor(s). At 504, the 3D reconstruction system generates calibrated color image sequences and calibrated depth image sequence(s) based on the received color imaging sequences and the received depth image sequence(s). At 506, the 3D reconstruction system constructs initial 3D patches using the calibrated color image sequences and the calibrated depth image sequence(s). At 508, the 3D reconstruction system generates a 3D patch cloud by expanding the initial 3D patches.

Figure 6:
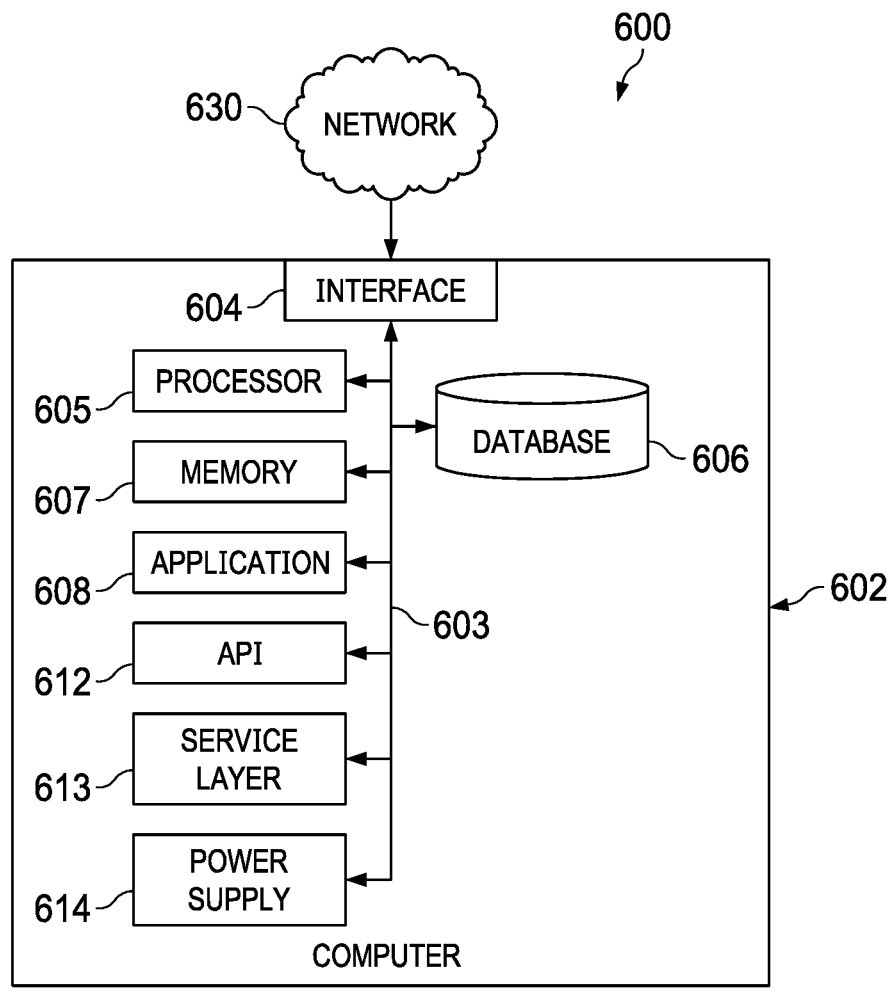
FIG. 6 is a block diagram illustrating an example of a computer system used to provide computational functionalities associated with described algorithms, methods, functions, processes, flows, and procedures, according to an implementation of the present disclosure.

FIG. 6 is a block diagram illustrating an example of a computer system 600 used to provide computational functionalities associated with described algorithms, methods, functions, processes, flows, and procedures, according to an implementation of the present disclosure. The illustrated computer 602 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 602 can comprise a computer that includes an input device, such as a keypad, keyboard, touch screen, another input device, or a combination of input devices that can accept user information, and an output device that conveys information associated with the operation of the computer 602, including digital data, visual, audio, another type of information, or a combination of types of information, on a graphical-type user interface (UI) (or GUI) or other UI. The computer 602 can be used to implement the 3D reconstruction system 100 in FIG. 1.

The computer 602 can serve in a role in a computer system as a client, network component, a server, a database or another persistency, another role, or a combination of roles for performing the subject matter described in the present disclosure. The illustrated computer 602 is communicably coupled with a network 630. In some implementations, one or more components of the computer 602 can be configured to operate within an environment, including cloud-computing-based, local, global, another environment, or a combination of environments.

At a high level, the computer 602 is an electronic computing device operable to receive, transmit, process, store, or manage data and information associated with the described subject matter. According to some implementations, the computer 602 can also include or be communicably coupled with a server, including an application server, e-mail server, web server, caching server, streaming data server, another server, or a combination of servers.

The computer 602 can receive requests over network 630 (for example, from a client software application executing on another computer 602) and respond to the received requests by processing the received requests using a software application or a combination of software applications. In addition, requests can also be sent to the computer 602 from internal users (for example, from a command console or by another internal access method), external or third-parties, or other entities, individuals, systems, or computers.

Each of the components of the computer 602 can communicate using a system bus 603. In some implementations, any or all of the components of the computer 602, including hardware, software, or a combination of hardware and software, can interface over the system bus 603 using an application programming interface (API) 612, a service layer 613, or a combination of the API 612 and service layer 613. The API 612 can include specifications for routines, data structures, and object classes. The API 612 can be either computer-language independent or dependent and refer to a complete interface, a single function, or even a set of APIs. The service layer 613 provides software services to the computer 602 or other components (whether illustrated or not) that are communicably coupled to the computer 602. The functionality of the computer 602 can be accessible for all service consumers using this service layer. Software services, such as those provided by the service layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 602, alternative implementations can illustrate the API 612 or the service layer 613 as stand-alone components in relation to other components of the computer 602 or other components (whether illustrated or not) that are communicably coupled to the computer 602. Moreover, any or all parts of the API 612 or the service layer 613 can be implemented as a child or a sub-module of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602. The interface 604 is used by the computer 602 for communicating with another computing system (whether illustrated or not) that is communicatively linked to the network 630 in a distributed environment. Generally, the interface 604 is operable to communicate with the network 630 and comprises logic encoded in software, hardware, or a combination of software and hardware. More specifically, the interface 604 can comprise software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors can be used according to particular needs, desires, or particular implementations of the computer 602. Generally, the processor 605 executes instructions and manipulates data to perform the operations of the computer 602 and any algorithms, methods, functions, processes, flows, and procedures as described in the present disclosure.

The computer 602 also includes a database 606 that can hold data for the computer 602, another component communicatively linked to the network 630 (whether illustrated or not), or a combination of the computer 602 and another component. For example, database 606 can be an in-memory, conventional, or another type of database storing data consistent with the present disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases of similar or differing types can be used according to particular needs, desires, or particular implementations of the computer 602 and the described functionality. While database 606 is illustrated as an integral component of the computer 602, in alternative implementations, database 606 can be external to the computer 602. As illustrated, the database 606 can hold the previously described image sequences from color sensors and depth sensor(s).

The computer 602 also includes a memory 607 that can hold data for the computer 602, another component or components communicatively linked to the network 630 (whether illustrated or not), or a combination of the computer 602 and another component. Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 or similar or differing types can be used according to particular needs, desires, or particular implementations of the computer 602 and the described functionality. While memory 607 is illustrated as an integral component of the computer 602, in alternative implementations, memory 607 can be external to the computer 602.

The application 608 is a software engine providing functionality according to particular needs, desires, or particular implementations of the computer 602, particularly with respect to functionality described in the present disclosure. For example, application 608 can serve as one or more components, modules, or applications discussed herein. Further, although illustrated as a single application 608, the application 608 can be implemented as multiple applications 608 on the computer 602. In addition, although illustrated as integral to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or another power management functionality). In some implementations, the power-supply 614 can include a power connector to allow the computer 602 to be plugged into a wall socket or another power source to, for example, power the computer 602 or recharge a rechargeable battery.

There can be any number of computers 602 associated with, or external to, a computer system containing computer 602, each computer 602 communicating over network 630. Further, the term "client," "user," or other appropriate terminology can be used interchangeably, as appropriate, without departing from the scope of the present disclosure. Moreover, the present disclosure contemplates that many users can use one computer 602, or that one user can use multiple computers 602.

Figure 7:
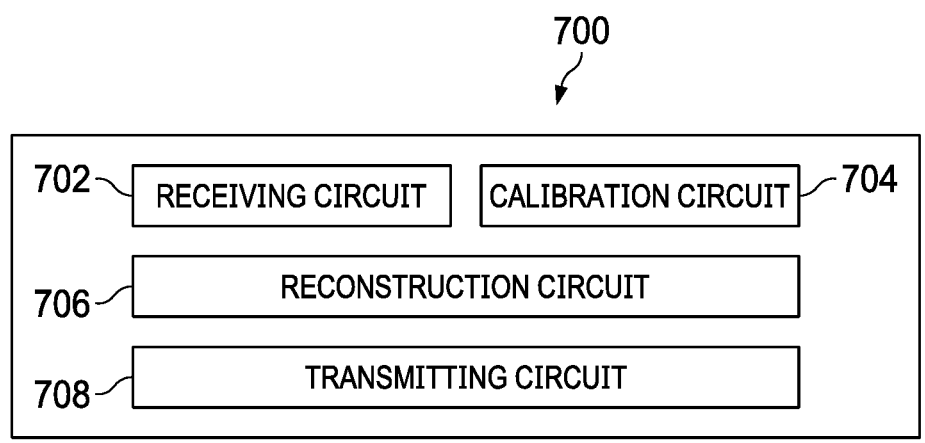
FIG. 7 is a schematic diagram illustrating an example structure of a 3D reconstruction system described in the present disclosure, according to an implementation.

FIG. 7 is a schematic diagram illustrating an example structure 700 of a 3D reconstruction system described in the present disclosure, according to an implementation. The 3D reconstruction system 100 in FIG. 1 can be implemented by the structure 700. The structure 700 includes a receiving circuit 702, a calibration circuit 704, a reconstruction circuit 706, and a transmitting circuit 708.

The receiving circuit 702 is configured to receive color image sequences from multiple color sensors, and at least one depth image sequence from at least one depth sensor. The number of the color sensors is larger than the number of the depth sensor(s).

The calibration circuit 704 is configured to generate calibrated color image sequences and at least one calibrated depth image sequence based on the received color imaging sequences and the received depth image sequence(s).

The reconstruction circuit 706 is configured to construct initial 3D patches using the calibrated color image sequences and the calibrated depth image sequence(s), and generate a 3D patch cloud by expanding the initial 3D patches. The reconstruction circuit 706 is further configured to generate a simplified 3D model or a complete 3D mesh based on the 3D patch cloud.

The transmitting circuit 708 is configured to send the simplified 3D model or the complete 3D mesh to an application for rendering the 3D reconstruction of the dynamic scene.

In some implementations, the capture module 102 can be included in the receiving circuit 702, the calibration module 104 included in the calibration circuit 704, the reconstruction module 116 included in the reconstruction circuit 706, and the rendering module 124 included in the transmitting circuit 708.

Described implementations of the subject matter can include one or more features, alone or in combination.

For example, in a first implementation, a computer-implemented method for a 3D reconstruction of a dynamic scene including: receiving, by one or more hardware processors, a plurality of color image sequences from a plurality of color imaging sensors, and at least one depth image sequence from at least one depth imaging sensor, wherein a color imaging sensor quantity is larger than a depth imaging sensor quantity; generating, by the one or more hardware processors, a plurality of calibrated color image sequences and at least one calibrated depth image sequence based on the plurality of color imaging sequences and the at least one depth image sequence; constructing, by the one or more hardware processors, a plurality of initial 3D patches using the plurality of calibrated color image sequences and the at least one calibrated depth image sequence; and generating, by the one or more hardware processors, a 3D patch cloud by expanding the plurality of initial 3D patches.

The foregoing and other described implementations can each, optionally, include one or more of the following features:

A first feature, combinable with any of the following features, wherein each of the plurality of color imaging sequences and the at least one depth image sequence includes images that capture the dynamic scene over a period of time.

A second feature, combinable with any of the previous or following features, wherein generating the plurality of calibrated color image sequences and the at least one calibrated depth image sequence includes: determining intrinsic parameters and extrinsic parameters for each of the plurality of color imaging sensors and the at least one depth imaging sensor; and calibrating the plurality of color image sequences and the at least one depth image sequence based on the intrinsic parameters and the extrinsic parameters to generate the plurality of calibrated color image sequences and the at least one calibrated depth image sequence.

A third feature, combinable with any of the previous or following features, wherein determining the extrinsic parameters for each of the plurality of color imaging sensors and the at least one depth imaging sensor includes geometrically calibrating the plurality of color imaging sensors and the at least one depth imaging sensor with a reference imaging sensor, wherein the reference imaging sensor is one of the plurality of color imaging sensors and the at least one depth imaging sensor.

A fourth feature, combinable with any of the previous or following features, wherein constructing the plurality of initial 3D patches includes: determining a set of salient points from the plurality of calibrated color image sequences and the at least one calibrated depth image sequence; and for each salient point: determining a set of imaging points corresponding to the salient point in the plurality of calibrated color image sequences and the at least one calibrated depth image sequence; and computing an initial 3D patch corresponding to the salient point based on the set of imaging points using a constrained triangulation.

A fifth feature, combinable with any of the previous or following features, wherein the constrained triangulation includes minimizing a cost function comprising at least one of a photo-consistency metric for the plurality of calibrated color image sequences, or a depth-consistency metric for the at least one calibrated depth image sequence.

A sixth feature, combinable with any of the previous or following features, wherein generating the 3D patch cloud by expanding the plurality of initial 3D patches includes: spatially dividing images of the plurality of calibrated color image sequences and the at least one calibrated depth image sequence into cells; and expanding the plurality of initial 3D patches using a regularized optimization to generate the 3D patch cloud that covers the cells.

A seventh feature, combinable with any of the previous or following features, further including computing a 3D mesh surface using the 3D patch cloud, with the 3D mesh comprising the 3D reconstruction of the dynamic scene.

In a second implementation, a computer-implemented system, including: a memory storage comprising instructions for a 3D reconstruction of a dynamic scene; and one or more hardware processors in communication with the memory storage, wherein the one or more hardware processors execute the instructions to: receive a plurality of color image sequences from a plurality of color imaging sensors, and at least one depth image sequence from at least one depth imaging sensor, wherein a color imaging sensor quantity is larger than a depth imaging sensor quantity; generate a plurality of calibrated color image sequences and at least one calibrated depth image sequence based on the plurality of color imaging sequences and the at least one depth image sequence; construct a plurality of initial 3D patches using the plurality of calibrated color image sequences and the at least one calibrated depth image sequence; and generate a 3D patch cloud by expanding the plurality of initial 3D patches.

The foregoing and other described implementations can each, optionally, include one or more of the following features:

A first feature, combinable with any of the following features, wherein each of the plurality of color imaging sequences and the at least one depth image sequence includes images that capture the dynamic scene over a period of time.

A second feature, combinable with any of the previous or following features, wherein generating the plurality of calibrated color image sequences and the at least one calibrated depth image sequence includes: determining intrinsic parameters and extrinsic parameters for each of the plurality of color imaging sensors and the at least one depth imaging sensor; and calibrating the plurality of color image sequences and the at least one depth image sequence based on the intrinsic parameters and the extrinsic parameters to generate the plurality of calibrated color image sequences and the at least one calibrated depth image sequence.

A third feature, combinable with any of the previous or following features, wherein determining the extrinsic parameters for each of the plurality of color imaging sensors and the at least one depth imaging sensor includes geometrically calibrating the plurality of color imaging sensors and the at least one depth imaging sensor with a reference imaging sensor, wherein the reference imaging sensor is one of the plurality of color imaging sensors and the at least one depth imaging sensor.

A fourth feature, combinable with any of the previous or following features, wherein constructing the plurality of initial 3D patches includes: determining a set of salient points from the plurality of calibrated color image sequences and the at least one calibrated depth image sequence; and for each salient point: determining a set of imaging points corresponding to the salient point in the plurality of calibrated color image sequences and the at least one calibrated depth image sequence; and computing an initial 3D patch corresponding to the salient point based on the set of imaging points using a constrained triangulation.

A fifth feature, combinable with any of the previous or following features, wherein the constrained triangulation includes minimizing a cost function comprising at least one of a photo-consistency metric for the plurality of calibrated color image sequences, or a depth-consistency metric for the at least one calibrated depth image sequence.

A sixth feature, combinable with any of the previous or following features, wherein generating the 3D patch cloud by expanding the plurality of initial 3D patches includes: spatially dividing images of the plurality of calibrated color image sequences and the at least one calibrated depth image sequence into cells; and expanding the plurality of initial 3D patches using a regularized optimization to generate the 3D patch cloud that covers the cells.

A seventh feature, combinable with any of the previous or following features, wherein the one or more hardware processors further execute the instructions to compute a 3D mesh surface using the 3D patch cloud, with the 3D mesh comprising the 3D reconstruction of the dynamic scene.

In a third implementation, a non-transitory computer-readable medium storing computer instructions for a 3D reconstruction of a dynamic scene which, when executed by one or more hardware processors, cause the one or more hardware processors to perform operations including: receiving a plurality of color image sequences from a plurality of color imaging sensors, and at least one depth image sequence from at least one depth imaging sensor, wherein a color imaging sensor quantity is larger than a depth imaging sensor quantity; generating a plurality of calibrated color image sequences and at least one calibrated depth image sequence based on the plurality of color imaging sequences and the at least one depth image sequence; constructing a plurality of initial 3D patches using the plurality of calibrated color image sequences and the at least one calibrated depth image sequence; and generating a 3D patch cloud by expanding the plurality of initial 3D patches.

The foregoing and other described implementations can each, optionally, include one or more of the following features:

A first feature, combinable with any of the following features, wherein generating the plurality of calibrated color image sequences and the at least one calibrated depth image sequence includes: determining intrinsic parameters and extrinsic parameters for each of the plurality of color imaging sensors and the at least one depth imaging sensor; and calibrating the plurality of color image sequences and the at least one depth image sequence based on the intrinsic parameters and the extrinsic parameters to generate the plurality of calibrated color image sequences and the at least one calibrated depth image sequence.

A second feature, combinable with any of the previous or following features, wherein constructing the plurality of initial 3D patches includes: determining a set of salient points from the plurality of calibrated color image sequences and the at least one calibrated depth image sequence; and for each salient point: determining a set of imaging points corresponding to the salient point in the plurality of calibrated color image sequences and the at least one calibrated depth image sequence; and computing an initial 3D patch corresponding to the salient point based on the set of imaging points using a constrained triangulation.

A third feature, combinable with any of the previous or following features, wherein generating the 3D patch cloud by expanding the plurality of initial 3D patches includes: spatially dividing images of the plurality of calibrated color image sequences and the at least one calibrated depth image sequence into cells; and expanding the plurality of initial 3D patches using a regularized optimization to generate the 3D patch cloud that covers the cells.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/-R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for a three-dimensional (3D) reconstruction of a dynamic scene, comprising:
   receiving, by one or more hardware processors, a plurality of color image sequences from a plurality of color imaging sensors, and at least one depth image sequence from at least one depth imaging sensor, wherein a color imaging sensor quantity is larger than a depth imaging sensor quantity;
   generating, by the one or more hardware processors, a plurality of calibrated color image sequences and at least one calibrated depth image sequence based on the plurality of color imaging sequences and the at least one depth image sequence;
   constructing, by the one or more hardware processors, a plurality of initial 3D patches using the plurality of calibrated color image sequences and the at least one calibrated depth image sequence; and
   generating, by the one or more hardware processors, a 3D patch cloud by expanding the plurality of initial 3D patches.

2. The method of claim 1, wherein each of the plurality of color imaging sequences and the at least one depth image sequence includes images that capture the dynamic scene over a period of time.

3. The method of claim 1, wherein generating the plurality of calibrated color image sequences and the at least one calibrated depth image sequence comprises:
   determining intrinsic parameters and extrinsic parameters for each of the plurality of color imaging sensors and the at least one depth imaging sensor; and
   calibrating the plurality of color image sequences and the at least one depth image sequence based on the intrinsic parameters and the extrinsic parameters to generate the plurality of calibrated color image sequences and the at least one calibrated depth image sequence.

4. The method of claim 3, wherein determining the extrinsic parameters for each of the plurality of color imaging sensors and the at least one depth imaging sensor includes geometrically calibrating the plurality of color imaging sensors and the at least one depth imaging sensor with a reference imaging sensor, wherein the reference imaging sensor is one of the plurality of color imaging sensors and the at least one depth imaging sensor.

5. The method of claim 1, wherein constructing the plurality of initial 3D patches comprises:
   determining a set of salient points from the plurality of calibrated color image sequences and the at least one calibrated depth image sequence; and
   for each salient point:
      determining a set of imaging points corresponding to the salient point in the plurality of calibrated color image sequences and the at least one calibrated depth image sequence; and
      computing an initial 3D patch corresponding to the salient point based on the set of imaging points using a constrained triangulation.

6. The method of claim 5, wherein the constrained triangulation includes minimizing a cost function comprising at least one of a photo-consistency metric for the plurality of calibrated color image sequences, or a depth-consistency metric for the at least one calibrated depth image sequence.

7. The method of claim 1, wherein generating the 3D patch cloud by expanding the plurality of initial 3D patches comprises:
   spatially dividing images of the plurality of calibrated color image sequences and the at least one calibrated depth image sequence into cells; and
   expanding the plurality of initial 3D patches using a regularized optimization to generate the 3D patch cloud that covers the cells.

8. The method of claim 1, further comprising computing a 3D mesh surface using the 3D patch cloud, with the 3D mesh comprising the 3D reconstruction of the dynamic scene.

9. A computer-implemented system, comprising:
   a memory storage comprising instructions for a three-dimensional (3D) reconstruction of a dynamic scene; and
   one or more hardware processors in communication with the memory storage, wherein the one or more hardware processors execute the instructions to:
      receive a plurality of color image sequences from a plurality of color imaging sensors, and at least one depth image sequence from at least one depth imaging sensor, wherein a color imaging sensor quantity is larger than a depth imaging sensor quantity;
      generate a plurality of calibrated color image sequences and at least one calibrated depth image sequence based on the plurality of color imaging sequences and the at least one depth image sequence;

construct a plurality of initial 3D patches using the plurality of calibrated color image sequences and the at least one calibrated depth image sequence; and generate a 3D patch cloud by expanding the plurality of initial 3D patches.

10. The computer-implemented system of claim 9, wherein each of the plurality of color imaging sequences and the at least one depth image sequence includes images that capture the dynamic scene over a period of time.

11. The computer-implemented system of claim 9, wherein generating the plurality of calibrated color image sequences and the at least one calibrated depth image sequence comprises:

determining intrinsic parameters and extrinsic parameters for each of the plurality of color imaging sensors and the at least one depth imaging sensor; and calibrating the plurality of color image sequences and the at least one depth image sequence based on the intrinsic parameters and the extrinsic parameters to generate the plurality of calibrated color image sequences and the at least one calibrated depth image sequence.

12. The computer-implemented system of claim 11, wherein determining the extrinsic parameters for each of the plurality of color imaging sensors and the at least one depth imaging sensor includes geometrically calibrating the plurality of color imaging sensors and the at least one depth imaging sensor with a reference imaging sensor, wherein the reference imaging sensor is one of the plurality of color imaging sensors and the at least one depth imaging sensor.

13. The computer-implemented system of claim 9, wherein constructing the plurality of initial 3D patches comprises:

determining a set of salient points from the plurality of calibrated color image sequences and the at least one calibrated depth image sequence; and for each salient point:

determining a set of imaging points corresponding to the salient point in the plurality of calibrated color image sequences and the at least one calibrated depth image sequence; and computing an initial 3D patch corresponding to the salient point based on the set of imaging points using a constrained triangulation.

14. The computer-implemented system of claim 13, wherein the constrained triangulation includes minimizing a cost function comprising at least one of a photo-consistency metric for the plurality of calibrated color image sequences, or a depth-consistency metric for the at least one calibrated depth image sequence.

15. The computer-implemented system of claim 9, wherein generating the 3D patch cloud by expanding the plurality of initial 3D patches comprises:

spatially dividing images of the plurality of calibrated color image sequences and the at least one calibrated depth image sequence into cells; and expanding the plurality of initial 3D patches using a regularized optimization to generate the 3D patch cloud that covers the cells.

16. The computer-implemented system of claim 9, wherein the one or more hardware processors further execute the instructions to compute a 3D mesh surface using the 3D patch cloud, with the 3D mesh comprising the 3D reconstruction of the dynamic scene.

17. A non-transitory computer-readable medium storing computer instructions for a three-dimensional (3D) reconstruction of a dynamic scene which, when executed by one or more hardware processors, cause the one or more hardware processors to perform operations comprising:

receiving a plurality of color image sequences from a plurality of color imaging sensors, and at least one depth image sequence from at least one depth imaging sensor, wherein a color imaging sensor quantity is larger than a depth imaging sensor quantity;

generating a plurality of calibrated color image sequences and at least one calibrated depth image sequence based on the plurality of color imaging sequences and the at least one depth image sequence;

constructing a plurality of initial 3D patches using the plurality of calibrated color image sequences and the at least one calibrated depth image sequence; and generating a 3D patch cloud by expanding the plurality of initial 3D patches.

18. The non-transitory computer-readable medium of claim 17, wherein generating the plurality of calibrated color image sequences and the at least one calibrated depth image sequence comprises:

determining intrinsic parameters and extrinsic parameters for each of the plurality of color imaging sensors and the at least one depth imaging sensor; and calibrating the plurality of color image sequences and the at least one depth image sequence based on the intrinsic parameters and the extrinsic parameters to generate the plurality of calibrated color image sequences and the at least one calibrated depth image sequence.

19. The non-transitory computer-readable medium of claim 17, wherein constructing the plurality of initial 3D patches comprises:

determining a set of salient points from the plurality of calibrated color image sequences and the at least one calibrated depth image sequence; and for each salient point:

determining a set of imaging points corresponding to the salient point in the plurality of calibrated color image sequences and the at least one calibrated depth image sequence; and computing an initial 3D patch corresponding to the salient point based on the set of imaging points using a constrained triangulation.

20. The non-transitory computer-readable medium of claim 17, wherein generating the 3D patch cloud by expanding the plurality of initial 3D patches comprises:

spatially dividing images of the plurality of calibrated color image sequences and the at least one calibrated depth image sequence into cells; and expanding the plurality of initial 3D patches using a regularized optimization to generate the 3D patch cloud that covers the cells.

* * * * *